(12) United States Patent
Dong

(10) Patent No.: US 11,610,098 B2
(45) Date of Patent: Mar. 21, 2023

(54) DATA AUGMENTATION IN TRANSACTION CLASSIFICATION USING A NEURAL NETWORK

(71) Applicant: PAYPAL, INC., San Jose, CA (US)

(72) Inventor: Yanfei Dong, Singapore (SG)

(73) Assignee: PayPal, Inc., San Jose, CA (US)

( * ) Notice: Subject to any disclaimer, the term of this patent is extended or adjusted under 35 U.S.C. 154(b) by 1119 days.

(21) Appl. No.: 16/234,188

(22) Filed: Dec. 27, 2018

(65) Prior Publication Data

US 2020/0210808 A1 Jul. 2, 2020

(51) Int. Cl.
| G06N 3/04 | (2006.01) |
| G06N 20/00 | (2019.01) |
| G06N 7/00 | (2006.01) |
| G06N 3/08 | (2006.01) |
| G06K 9/62 | (2022.01) |
| G06Q 20/40 | (2012.01) |
| G06N 3/088 | (2023.01) |

(52) U.S. Cl.
CPC .......... *G06N 3/0454* (2013.01); *G06K 9/6256* (2013.01); *G06K 9/6268* (2013.01); *G06N 3/088* (2013.01); *G06N 7/005* (2013.01); *G06N 20/00* (2019.01); *G06Q 20/4016* (2013.01)

(58) Field of Classification Search
CPC ...... G06N 3/0454; G06N 3/088; G06N 20/00; G06N 7/005; G06K 9/6256; G06K 9/6269; G06Q 20/4016
See application file for complete search history.

(56) References Cited

U.S. PATENT DOCUMENTS

| 9,336,315 | B2 | 5/2016 | Ovsjanikovs et al. |
| 9,704,054 | B1* | 7/2017 | Tappen ............... G06V 10/40 |
| 2011/0264612 | A1 | 10/2011 | Ryman-Tubb |
| 2015/0254555 | A1 | 9/2015 | Williams et al. |
| 2016/0292589 | A1 | 10/2016 | Taylor et al. |
| 2017/0068888 | A1 | 3/2017 | Chung et al. |

(Continued)

OTHER PUBLICATIONS

Zhai et al., "Semisupervised Autoencoder for Sentiment Analysis," AAAI (2016) (Year: 2016).*

(Continued)

*Primary Examiner* — Kakali Chaki
*Assistant Examiner* — Kevin L. Smith
(74) *Attorney, Agent, or Firm* — Haynes and Boone, LLP

(57) ABSTRACT

Systems and methods for data augmentation in a neural network system includes performing a first training process, using a first training dataset on a neural network system including an autoencoder including an encoder and a decoder to generate a trained autoencoder. A trained encoder is configured to receive a first plurality of input data in an N-dimensional data space and generate a first plurality of latent variables in an M-dimensional latent space, wherein M is an integer less than N. A sampling process is performed on the first plurality of latent variables to generate a first plurality of latent variable samples. A trained decoder is used to generate a second training dataset using the first plurality of latent variable samples. The second training dataset is used to train a first classifier including a first classifier neural network model to generate a trained classifier for providing transaction classification.

20 Claims, 9 Drawing Sheets

(56) References Cited

U.S. PATENT DOCUMENTS

2018/0165554 A1* 6/2018 Zhang .................... G06N 3/084
2018/0197071 A1* 7/2018 Dong .................... G06N 3/0454
2018/0218261 A1 8/2018 Myara et al.
2019/0095798 A1* 3/2019 Baker .................. G06N 3/0454

OTHER PUBLICATIONS

Fjodor van Veen "The Neural Network Zoo—Autoencoder," Asimov Institute (Wayback Machine Dec. 19, 2018)<https://web.archive.org/web/20181219212455/https://www.asimovinstitute.org/neural-network-zoo/> (Year: 2018).*

Zheng et al., "Generative adversarial network based telecom fraud detection at the receiving bank," Neural Networks (Mar. 2018) (Year: 2018).*

Roy et al., "A Robust System for Noisy Image Classification Combining Denoising Autoencoder and Convolutional Neural Network," IJACSA (Jan. 2018) (Year: 2018).*

Chen et al., "Credit Card Fraud Detection Using Sparse Autoencoder and Generative Adversarial Network," IEEE (Nov. 2018) (Year: 2018).*

Fjodor van Veen "The Neural Network Zoo—GAN," Asimov Institute (Wayback Machine Dec. 19, 2018) <https://web.archive.org/web/20181219122429/http://www.asimovinstitute.org/neural-network-zoo/> (Year: 2018).*

Saifuddin Hitawala, "Comparative Study on Generative Adversarial Networks," University of Waterloo (2018) (Year: 2018).*

Mariani et al., "BAGAN: Data Augmentation with Balancing GAN,"arXiv (Jun. 5, 2018) (Year: 2018).*

Ian J. Goodfellow; Jean Pouget-Abadie; Mehdi Mirza; Bing Xu; David Warde-Farleu; Sherjil Ozair; Aaron Courville and Yoshua Bengio; "Generative Adversarial Nets," Jun. 10, 2014, 9 Pages, arXiv:1406.2661v1 [stat.ML], University of Montreal, Canada, http://www.github.com/goodfeli/adversarial.

Alireza Makhzani; Jonathon Shlens Navdeep Jaitly; Ian Goodfellow and Brendan Frey, "Adversarial Autoencoders," May 25, 2016, 16 Pages, arXiv:1511.05644v2 [cs.LG].

Liu Han et al.: "Unsupervised fault diagnosis of rolling bearings using a deep neural network based on generative adversarial networks", Neurocomputing, Elsevier, Amsterdam, NL, vol. 315, Aug. 4, 2018, pp. 412-424, XP085467828, ISSN: 0925-2312, DOI:10.1016/J.NEUCOM.2018.07.034, 13 pages.

Extended European Search Report dated Feb. 8, 2022 from corresponding European application No. EP 19 90 4309, 8 pages.

International Appl. No. PCT/US2019/068836, International Search Report and Written Opinion dated Mar. 19, 2020, 11 pages.

International Application No. PCT/US2019/068836, International Preliminary Report on Patentability dated Jul. 8, 2021, 9 pages.

Dertat. "Applied Deep Learning—Part 3: Autoencoders." In: Medium. Oct. 3, 2017, Retrieved on Feb. 28, 2020 from <https://towardsdatascience.com/applied-deep-learning-part-3-autoencoders-1c083af4d798>.

Makhzani et al. "Adversarial autoencoders." In: arXiv preprint arXiv:151 1 .05644. May 25, 2016, pp. 1-20, Retrieved on Feb. 28, 2020 from <https://arxiv.org/pdf/1511.05644.pdf/o5D>.

* cited by examiner

DATA AUGMENTATION IN TRANSACTION CLASSIFICATION USING A NEURAL NETWORK

BACKGROUND

Technical Field

The present disclosure generally relates to machine learning and artificial intelligence technology, and more particularly to data augmentation in training neural networks for transaction classification, according to various embodiments.

Related Art

Using machine learning and artificial intelligence technology in detection systems presents various challenges. For example, training a neural network for detection of particular events indicated in real-time data may require a training dataset including a large number of prior events that are labeled (e.g. indicative of a particular outcome of a past occurrence). Such a training dataset may include noise, e.g., prior events that are incorrectly labeled. Such noise may affect the accuracy of the detection systems using neural networks or other artificial intelligence techniques. Applicant recognizes that there is a need for improved accuracy in detection systems based on real-time events.

Figure 1:
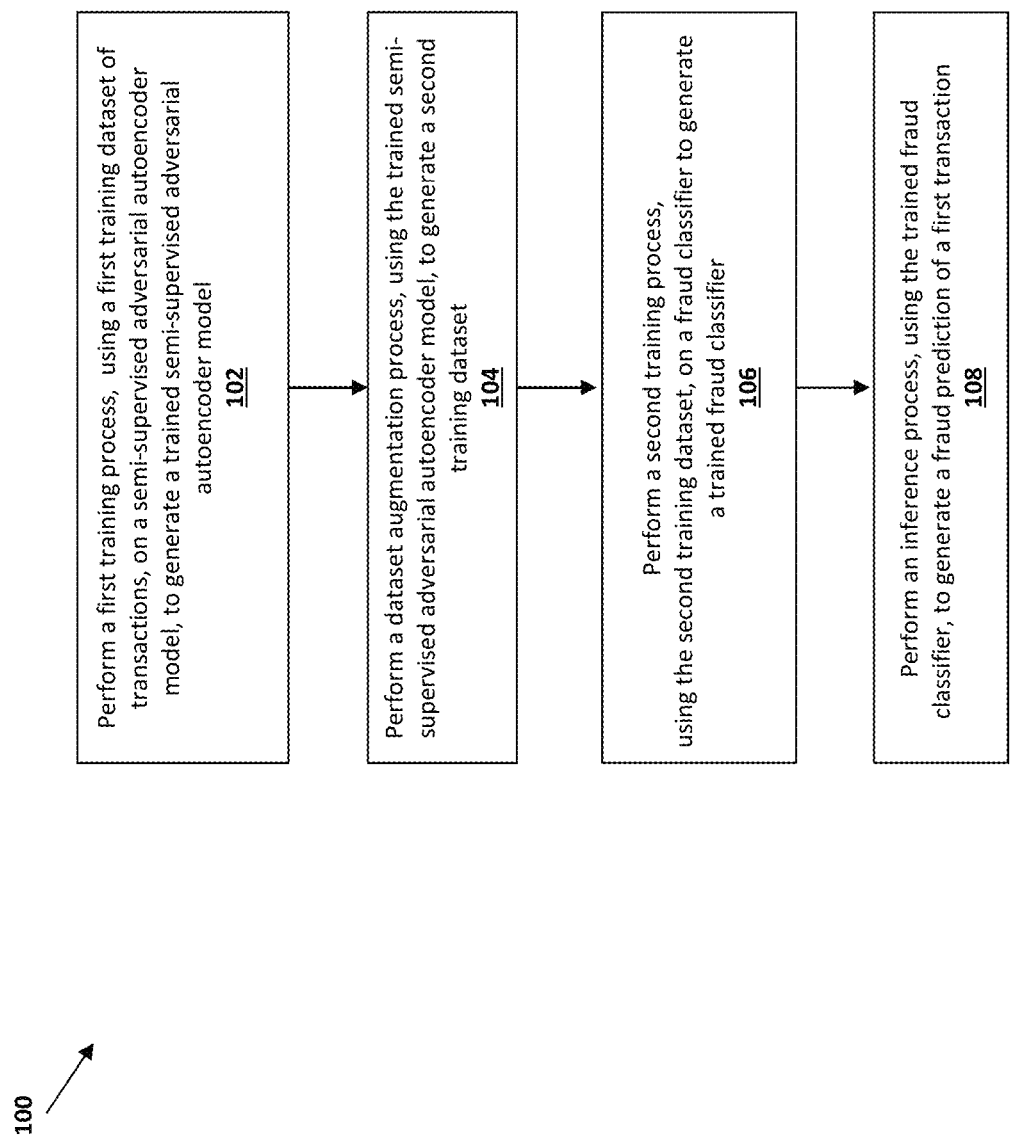
FIG. 1 is a flowchart illustrating a method for fraud detection in accordance with an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods for improved analytical techniques that relate to fraud detection in various embodiments, for example, for transactions conducted through one or more computing devices.

More and more consumers are conducting electronic transactions, such as purchasing items and services, via computing devices over electronic networks such as, for example, the Internet. Consumers routinely purchase products and services from merchants and individuals alike. The transactions may take place directly between a physical or online merchant or retailer and the consumer, and payment is typically made by entering credit card or other funding source information. Transactions may also take place with the aid of an online or mobile service provider such as, for example, PayPal, Inc. of San Jose, Calif. Such service providers can make transactions easier and safer for the parties involved. Purchasing with the assistance of a service provider from the convenience of virtually anywhere using a mobile device is one main reason why online and mobile purchases are growing very quickly.

Fraudulent transactions are major problems with internet service providers. Billions of dollars are lost due to fraud. Furthermore, as nefarious entities become more sophisticated, countermeasures for fraud also need to become more sophisticated.

As discussed above, labeled training data for a neural network system for fraud detection often include transactions labeled as fraudulent or legitimate. Often, the training data includes various noise (e.g. affecting labeling) that affects the performance (e.g., accuracy, efficiency) of fraud detection. In an example, a transaction labeled as a fraudulent transaction may be, in fact, legitimate, or vice versa. In another example, some transactions (e.g., financial transactions) have a long maturity time, and complete labeling of those transactions may not be available before the maturity date of those transactions (for example, transactions funded by a credit card may have a particular period of time in which a consumer is allowed to dispute the charge as fraud). In yet another example, the labeling of the transactions may be provided a long time ago (e.g., many years ago) and outdated and is no longer accurate, and as such, is noisy as well. Stated another way, detecting fraud even using sophisticated computer machine learning algorithms can be difficult due to the nature of the underlying transactional data.

In various embodiments described below, systems and methods are described to address the noise labeling problems in a training dataset to improve the accuracy and efficiency of a neural network system for fraud detection (note that these techniques are applicable to other machine learning models as well, in various embodiments). In a neural network system for fraud detection, a first training process is performed using a first training dataset, where the neural network system includes an autoencoder including an encoder and a decoder to generate a trained autoencoder according to some embodiments. A trained encoder is configured to receive a first plurality of input data in an N-dimensional data space and generate a first plurality of latent variables in an M-dimensional latent space based on a predetermined prior distribution, wherein M is an integer less than N. A sampling process is performed on the first plurality of latent variables to generate a first plurality of latent variable samples. A trained decoder is used to generate a second training dataset using the first plurality of latent variable samples. The second training dataset is used to train a first classifier including a first classifier neural network model to generate a trained classifier for providing transaction classification. By performing data augmentation using the autoencoder, the second training dataset is provided with less noise and with more training data at a decision boundary of the transaction classifier. As such, performance of the neural network for fraud detection is improved.

Figure 2:
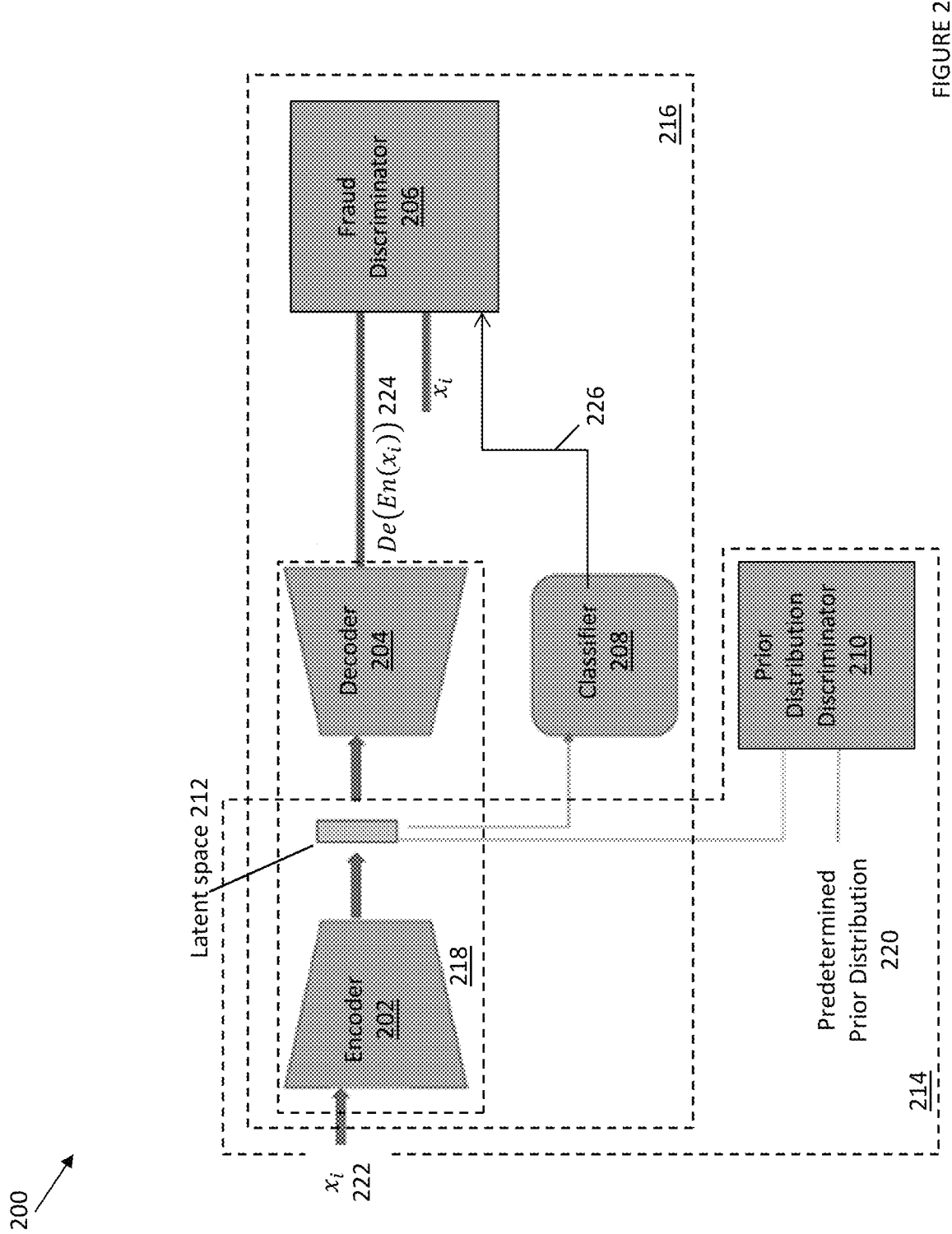
FIG. 2 is a schematic illustrating a neural network system for fraud detection or a portion thereof in accordance with an embodiment.

Referring to FIG. 1, an embodiment of a method 100 for providing data augmentation for fraud detection using a neural network system is illustrated. Referring to FIGS. 1 and 2, the method may begin at block 102, where a first training process is performed on a semi-supervised adversarial autoencoder model, to generate a first trained semi-supervised adversarial autoencoder model. A first training dataset of transactions may be used in the first training process. FIG. 1 will be further discussed in detail below after an explanation of FIG. 2. All or a portion of the operations referred to in FIGS. 1, 2, 3, 4, 5, and elsewhere herein may be performed in various embodiments by any suitable computer system including system 800 as discussed in FIG. 8. Such a computer system may comprise multiple processors and/or server systems in some instances (e.g. a cloud cluster or other computer cluster).

Referring to FIG. 2, a neural network system 200 for fraud detection including a semi-supervised adversarial autoencoder model is illustrated, according to some embodiments. The neural network system 200 as shown includes an autoencoder 218, a generative adversarial network (GAN) 214 with a prior distribution discriminator 210 (also referred to as a prior distribution GAN 214), and a GAN 216 with a fraud discriminator 206 (also referred to as a fraudulent transaction GAN 216).

As shown in the example FIG. 2, the autoencoder 218 includes an encoder 202 and a decoder 204, each of the encoder 202 and decoder 204 may be implemented using a neural network model. The autoencoder 218 may learn to compress an input data $x_i$ 222 (e.g., an input transaction) into a latent variable (also referred to as a latent code or a latent representation), denoted as $En(x_i)$ in a latent space 212. In an example, the input transaction 222 may have N attributes (e.g., transaction time, transaction type, payor, payee, transaction history, etc.), and as such, is in an N dimensional space. The latent space 212 may have M dimensions, where M is less than N. The decoder 204 may uncompress that latent representation $En(x_i)$ into a reconstructed data 224 (denoted as $De(En(x_i))$) that closely matches the input data $x_i$ 222. As such, the autoencoder 218 engages in dimensionality reduction, for example by learning how to ignore noise. A reconstruction loss function may be used by the autoencoder 218 to generate a reconstruction error. An exemplary reconstruction loss function is provided as follows:

$$L_{reconstruction} = \frac{1}{n}\sum_{i=1}^{n}\|x_i - De(En(x_i))\|.$$

The autoencoder 218 may be trained (e.g., using backpropagation and gradient descent) to minimize the reconstruction loss function. In one example, the goal of the training process is to learn the identity function of the training dataset with the minimum reconstruction error. Thus, the autoencoder is configured to learn how to reconstruct training data as best as possible.

In the example of FIG. 2, a classifier 208 is a neural network that may be trained to provide fraud prediction. In an example, the classifier 208 may receive a transaction or a latent variable corresponding to the transaction, and provide an output including a fraud prediction of that transaction. The output may indicate the probability (e.g., between 0 and 1) of a particular transaction belonging to a certain class (e.g., a fraudulent transaction class or a legitimate transaction class). A cross entropy loss function may be used to train the classifier 208 for fraud prediction. An example cross entropy loss function is provided as follows:

$$L_{cross\_entropy} = \frac{1}{n}\sum_{i=1}^{n}[y_i\log(p_i) + (1 - y_i)\log(1 - p_i),$$

where $p_i$ is a predicted output of the $i^{th}$ data by the classifier, and $y_i$ is the label information of the $i^{th}$ data.

As shown in the example of FIG. 2, the prior distribution GAN 214 includes an encoder 202 and a prior distribution discriminator 210 having a prior distribution discrimination function PD. Generally, a GAN is a framework that establishes a min-max adversarial game between two neural networks, a generator (also referred to as a generative model) and a discriminator (also referred to as a discriminative model). The discriminator discriminates between instances from true data distribution and candidates produced by the generator. The generator's training objective is to increase the error rate of the discriminator network (i.e., "fool" the discriminator by producing novel synthesized instances that appear to have come from the true data distribution). In an example, the encoder 202 is the generator of the prior distribution GAN 214, and the prior distribution discriminator 210 is the discriminator of the prior distribution GAN 214. A prior distribution adversarial loss function may be used to train the prior distribution GAN 214 to impose a predetermined prior distribution 220 (e.g., Gaussian distribution, Gamma distribution, exponential distribution, any suitable distribution, and/or a combination thereof) on the latent variables in the latent space 212. An exemplary prior distribution adversarial loss function is provided as follows:

$$\frac{1}{n}\sum_{i=1}^{n}\log PD(p_i) + \frac{1}{n}\sum_{i=1}^{n}\log(1 - PD(En(x_i))),$$

where $p_i$ is a predicted output of the $i^{th}$ data by the classifier.

As shown in the example FIG. 2, the fraudulent transaction GAN 216 includes the autoencoder 218, a classifier 208, and a fraud discriminator 206 having a fraud discrimination function FD. In an example, the autoencoder 218 is the generator of the fraudulent transaction GAN 216, and the fraud discriminator 206 is the discriminator of the fraudulent transaction GAN 216. Output of the classifier 208 may indicate the probability of a particular transaction belonging to a certain class (e.g., a fraudulent transaction class or a legitimate transaction class), and may be used in a fraud sensitive weighted adversarial loss function for training the fraudulent transaction GAN 216. An exemplary fraud-sensitive weighted adversarial loss function is provided as follows:

$$\frac{1}{n}\sum_{i=1}^{n}w^i\log FD(x_i) + \frac{1}{n}\sum_{i=1}^{n}w^i\log(1 - FD(De(En(x_i)))),$$

where $w^i$ is the output of the classifier 208 corresponding to the input data $x_i$.

Figure 3:
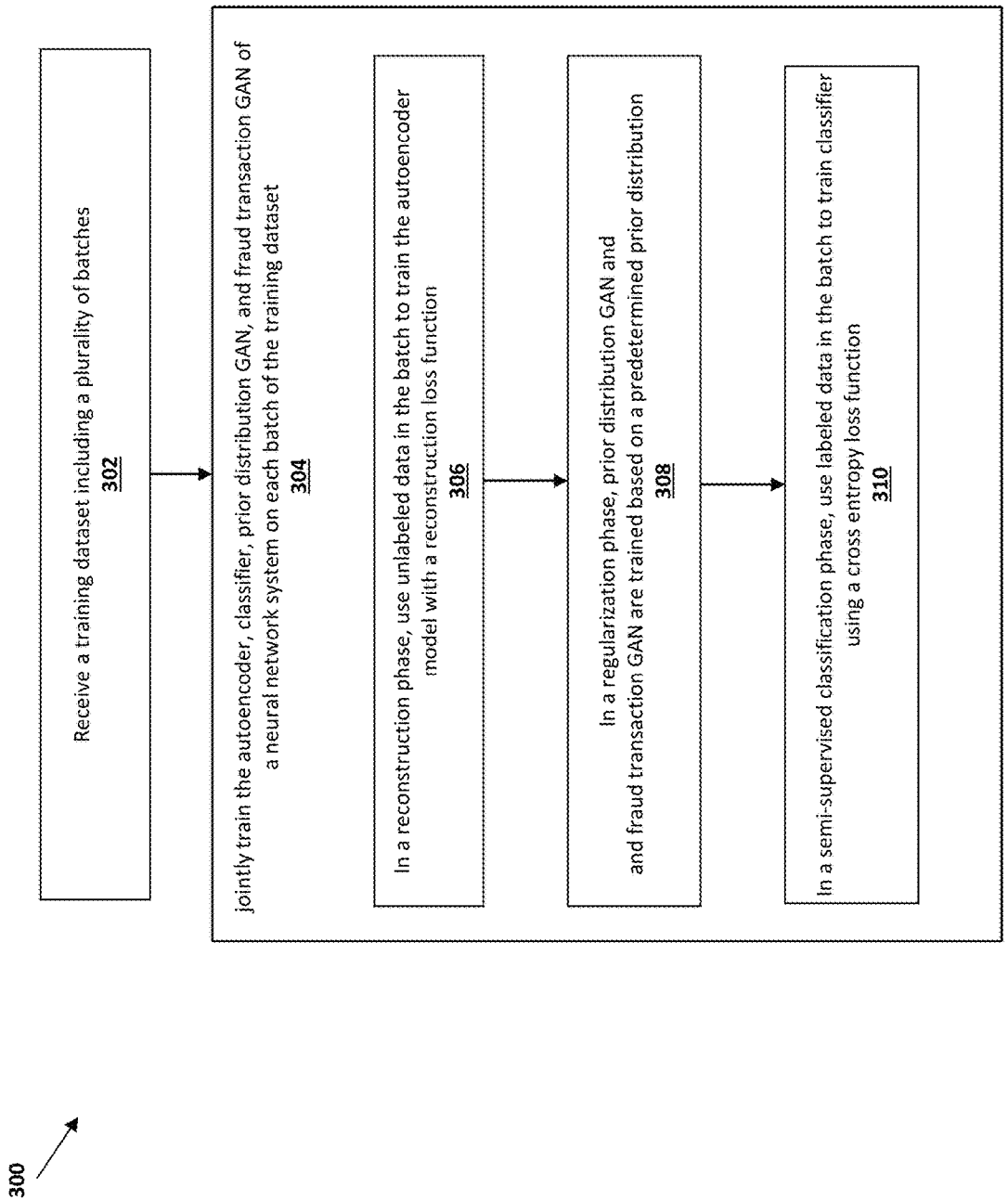
FIG. 3 is a flowchart illustrating a method for training a neural network system for fraud detection in accordance with an embodiment.

Referring to FIG. 3, illustrated is a method 300 for performing a training process (e.g., at block 102 of FIG. 1 using a first training dataset) on a neural network system (e.g., neural network system 200 of FIG. 2). The method 300 starts at block 302, where a training dataset including a plurality of batches of training data is received.

The method 300 may proceed to block 304, where for each batch of the training dataset, jointly train the neural network models (e.g., the autoencoder 218, classifier 208, prior distribution GAN 214, and fraud transaction GAN 216) of the neural network system 200. As shown in FIG. 3, the training performed using each batch of the training dataset includes a reconstruction phase 306, a regularization phase 308, and a semi-supervised classification phase 310. At block 306, in a reconstruction phase, the autoencoder 218 is trained using unlabeled data in the batch with a reconstruction loss function. At block 308, in a regularization phase, the prior distribution GAN 214, and fraud transaction GAN 216 are trained based on the predetermined prior distribution. At block 310, in a semi-supervised classification phase, the classifier 208 is trained using labeled data in the batch using a cross-entropy loss function.

Figure 4:
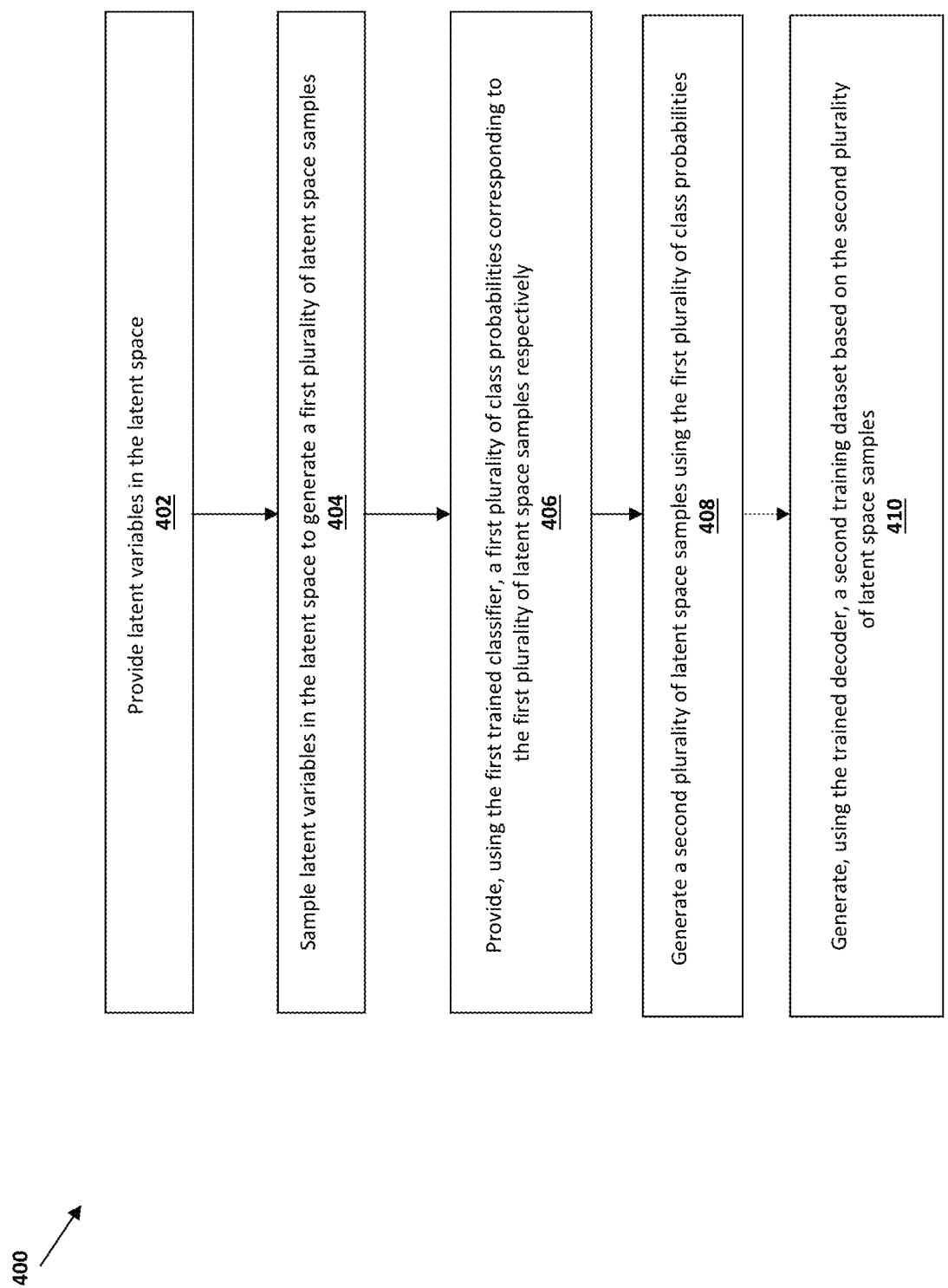
FIG. 4 is a flowchart illustrating a method for data augmentation for a neural network system for fraud detection in accordance with an embodiment.
Figure 5:
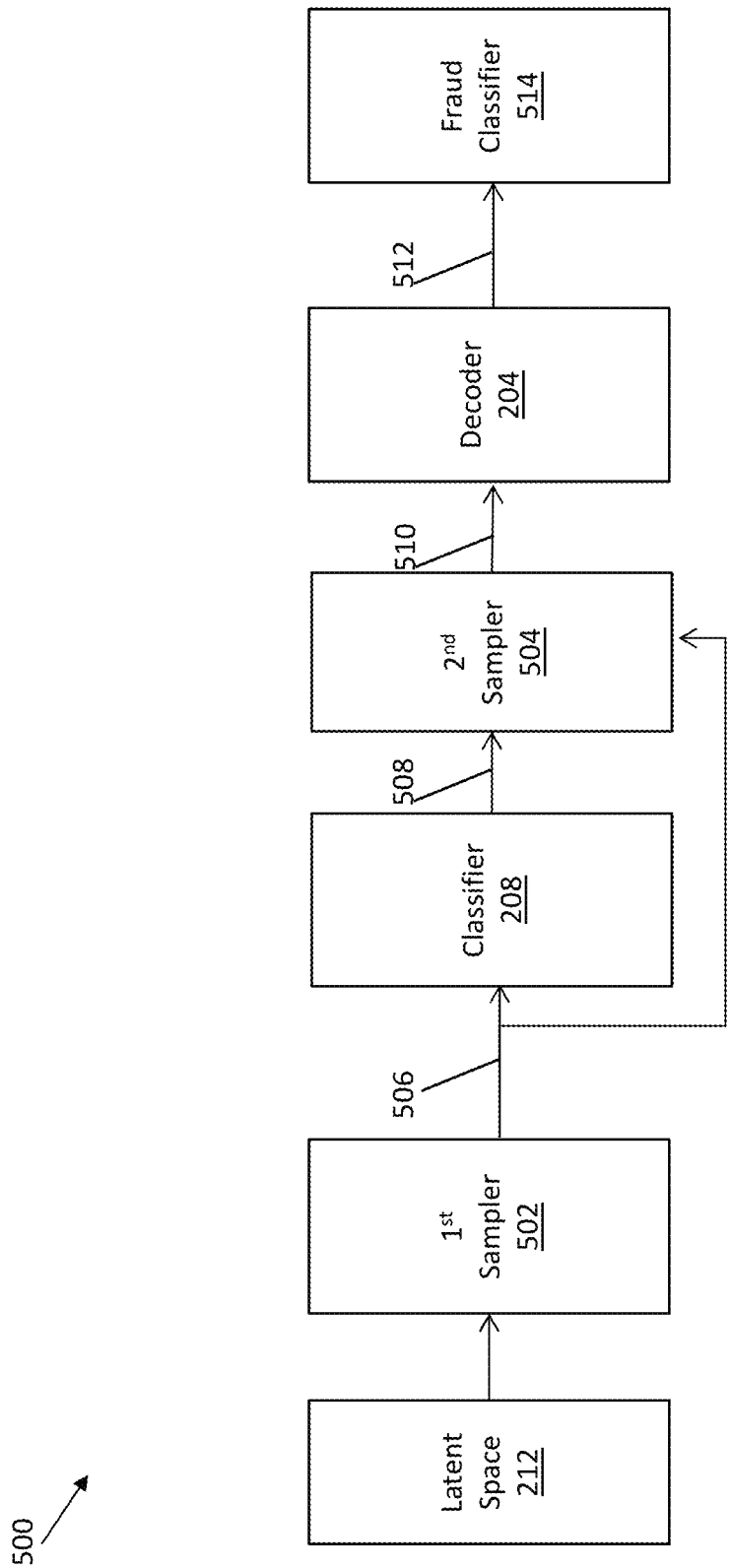
FIG. 5 is a schematic illustrating a neural network system for fraud detection or a portion thereof in accordance with an embodiment.

The method 100 may then proceed to block 104, where a dataset augmentation process is performed, using latent variables in the latent space of the first trained semi-supervised adversarial autoencoder model, to generate a second training dataset. Referring to FIGS. 4 and 5, an example of the dataset augmentation process is described in detail. FIG. 4 illustrates a method 400 for performing a dataset augmentation process (e.g., block 104 of FIG. 1) according to some embodiments, and FIG. 5 illustrates a dataset augmentation system 500 for performing the dataset augmentation process according to some embodiments.

The method 400 may begin at block 402, where latent variables in the latent space are provided. In some embodiments, the latent variables in the latent space 212 may be generated by a trained neural network system 200 trained using an input dataset (e.g., the first training dataset, a subset of the first training dataset, other suitable dataset, and/or a combination thereof) by the first training process of block 102 of FIG. 1. In an example, a trained encoder 202 of the neural network system 200 may use input data to generate latent variables in the latent space 212 such that the latent variables have a predetermined prior distribution 220.

The method 400 may begin at block 404, where latent variables in the latent space 212 are sampled to generate a first plurality of latent space samples. As shown in the example of FIG. 5, a first sampler 502 may perform a sampling process (e.g., a simple random sampling method or any other suitable sampling method) on the latent variables in the latent space 212 to generate a first plurality of latent space samples 506. The size of the first plurality of latent space samples 506 may be determined based on a performance requirement (e.g., accuracy requirement, training time requirement) for fraud detection. In an example, a larger number of latent space samples may be provided for a higher accuracy requirement for fraud detection. In another example, a smaller number of latent space samples may be provided for a faster training time requirement.

The method 400 may proceed to block 406, where a first trained classifier is used to provide a first plurality of class probabilities corresponding to the first plurality of latent space samples respectively. As shown in the example of FIG. 5, a trained classifier 208 (e.g., trained by the first training process of block 102 of FIG. 1) receives the first plurality of latent space samples 506 from the first sampler 502, and generates a first plurality of class probabilities 508 corresponding to the first plurality of latent space samples 506 respectively. The class probabilities 508 indicate the probability of a particular input data (e.g., an input transaction) belonging to a certain class (e.g., a fraudulent transaction class or a legitimate transaction class).

The method 400 may proceed to block 408, where a second sampler performs a sampling process on the first plurality of latent space samples 506 using the class probabilities 508. As shown in the example of FIG. 5, a second sampler 504 receives the first plurality of latent space samples 506 from the first sampler 502, and receives the corresponding class probabilities 508 from the classifier 208. The second sampler 504 may perform a sampling process on the first plurality of latent space samples 506 using the class probabilities 508, and generate a second plurality of latent space samples 510. Various sampling techniques addressing noisy label problems may be used by the second sampler 502, including for example, an adaptive bootstrap sampling method. By using the output of the trained classifier 208 in the sampling process, the second plurality of latent space samples 510 may be used to generate a training dataset with less noise than the first training dataset. In some examples, by using the output of the trained classifier 208 in the sampling process, more latent space samples corresponding to fraudulent transactions near a decision boundary of the classifier 208 may be generated in the second set of training data. A decision boundary is the region of a problem space in which the output label of a classifier is ambiguous. In other words, a decision boundary is the division between two classifier regions (e.g., fraudulent transaction region and legitimate transaction region). Including more fraudulent transactions near a decision boundary in the second training dataset improves the performance of a classifier for fraudulent detection.

The method 400 may proceed to block 410, where a second training dataset is generated by the trained neural network system 200 using the second plurality of latent space samples. Referring to the example of FIG. 5, a trained decoder 304 (e.g., trained by the first training process of block 102 of FIG. 1) receives the second plurality of latent space samples 510 (e.g., with latent variables in the latent space 212 having a lower dimension) from the second sampler 504, and generates a second training dataset (e.g., with data in the transaction data space having a higher dimension).

Referring to FIG. 1, the method 100 may then proceed to block 106, where a second training process is performed, using the second training dataset, on a fraud classifier to generate a trained fraud classifier. Referring to the example of FIG. 5, a second training process is performed on a fraud classifier 514 using the second training dataset 512 from the decoder 204. In some embodiments, the fraud classifier 514 is the same as the classifier 208 of FIG. 2 used in the first training process. Alternatively, in some embodiments, the fraud classifier 514 is different from classifier 208 of FIG. 2. In an example, the fraud classifier 514 includes a neural network having less hidden layers than that of the classifier 208 for a faster inference process. In another example, the fraud classifier 514 includes a neural network model that is of a different type from the neural network model of the classifier 208.

The method 100 may then proceed to block 108, where an inference process is performed on a trained fraud classifier to generate a fraud prediction of a first transaction. In an example, at the inference process, a trained fraud classifier 514 (e.g., after trained at block 106 using the second plurality of training dataset) receives a transaction (e.g., an online transaction received from a third party service provider relating to a transaction associated with a user), and generates a fraud prediction indicating the likelihood that the transaction is a fraudulent transaction.

It is noted that while transaction classifications for online transactions (e.g., a payment transaction, transactions for taking an online course, playing computer games, viewing digital content such as news/blogs, shopping) are used as examples for data augmentation in a neural network system, the methods 100, 300, and 400 for providing data augmentation in a neural network system and systems described may be used to improve accuracy and efficiency of the neural network system (e.g., by addressing the noise label problems) for any suitable applications of neural network systems. For example, the described systems and methods may be used in applications for image processing, computer vision, natural language processing, autonomous driving, etc.

Thus, systems and methods have been described that allows data augmentation for a neural network system for transaction classification to address noisy label problems in training the neural network system and to improve the accuracy and efficiency of the neural network system. In some embodiments, a first training process is performed, using a first training dataset including a plurality of transactions, on a neural network system (e.g., including a semi-supervised adversarial autoencoder model) to generate a trained neural network work. A trained encoder of the trained autoencoder is configured to receive a first plurality of input data in an N-dimensional data space and generate a first plurality of latent variables in an M-dimensional latent space, wherein M is an integer less than N. A data augmentation process includes a sampling process is performed. The sampling process is performed on the first plurality of latent variables to generate a first plurality of latent variable samples. A trained decoder of the trained autoencoder is used to generate a second training dataset (also referred to as an augmented training dataset) in the N-dimensional data space using the first plurality of latent variable samples. A second training process is performed using the second training dataset, on a first classifier including a first classifier neural network model to generate a trained classifier for providing transaction classification of a first transaction. Furthermore, in some embodiments, the neural network system includes a second classifier including a second classifier neural network model for transaction classification. The second classifier is trained during the first training process using the first training dataset, to generate a trained second classifier. The sampling process includes a first sub-sampling process on the first plurality of latent variables, using a first sampler, to generate a second plurality of latent variable samples. The trained second classifier generates a plurality of class probabilities corresponding to the second plurality of latent variable samples respectively. A second sub-sampling process is performed on the second plurality of latent variable samples, using a second sampler, to generate the first plurality of latent variable samples, based on the plurality of class probabilities.

Figure 6:
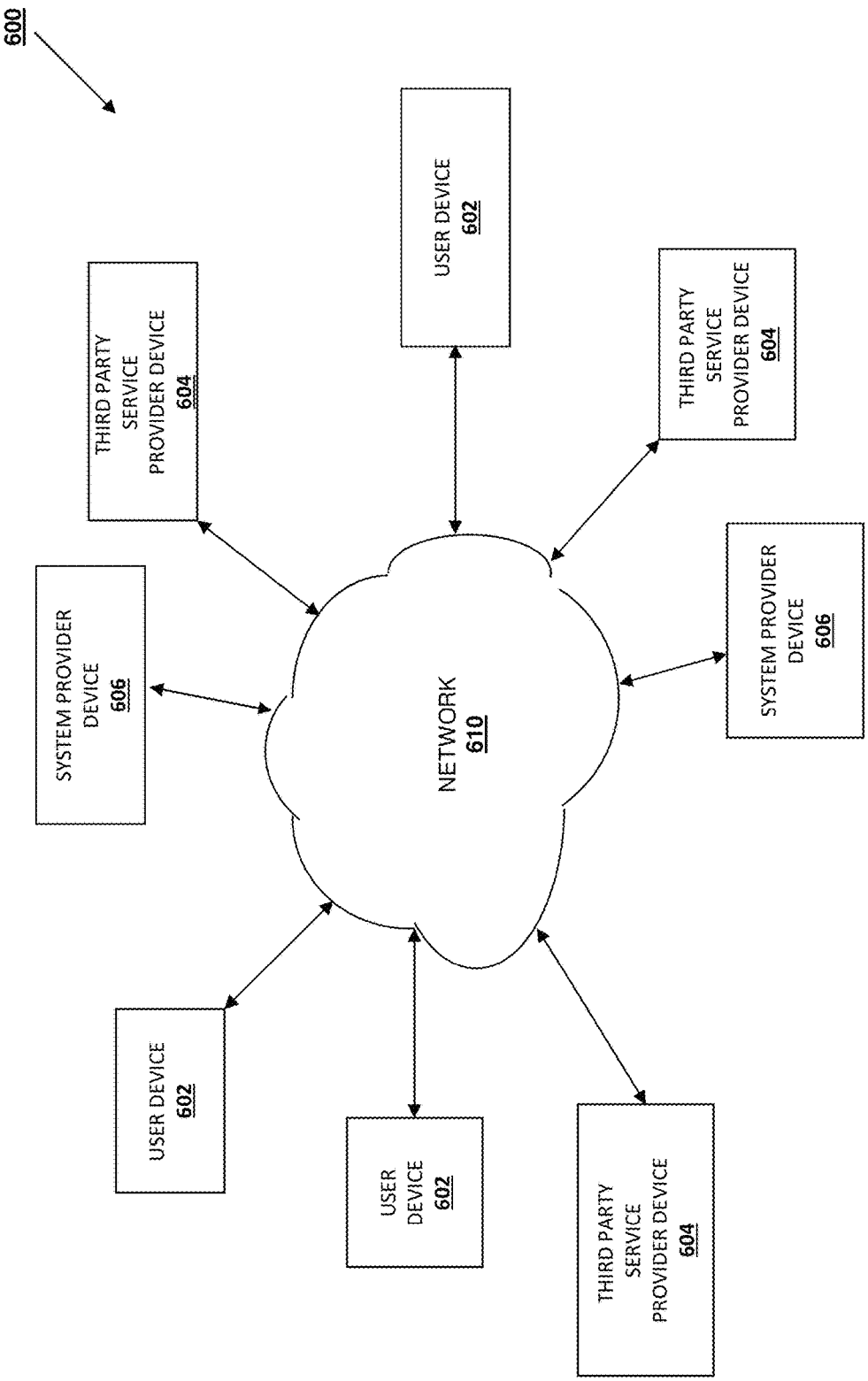
FIG. 6 is a schematic view illustrating an embodiment of a networked system.

Referring now to FIG. 6, an embodiment of a network-based system 600 for implementing one or more processes described herein is illustrated. As shown, network-based system 600 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 6 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 600 illustrated in FIG. 6 includes one or more user devices 602, one or more system provider devices 606, and one or more third-party service provider devices 604 in communication over a network 610. Any of the user devices 602 may be a user device associated with a transaction with a third-party service provider device or a system provider device discussed above. The system provider device 606 may implement the neural network system for transaction classification (e.g., fraud detection), and may be operated by a system provider such as, for example, PayPal Inc. of San Jose, Calif. The third party service provider device 604 may be the service provider device providing transaction services with the user device 602 and may be operated by various service providers including payment service providers, discount providers, marketplace providers, and/or any other service providers.

The user devices 602, system provider devices 606, and third party service provider devices 604 may each include one or more processors, memories, and other appropriate components for executing instructions such as program code and/or data stored on one or more computer readable mediums to implement the various applications, data, and steps described herein. For example, such instructions may be stored in one or more computer-readable mediums such as memories or data storage devices internal and/or external to various components of the system 600, and/or accessible over the network 610.

The network 610 may be implemented as a single network or a combination of multiple networks. For example, in various embodiments, the network 610 may include the Internet and/or one or more intranets, landline networks, wireless networks, and/or other appropriate types of networks.

The user device 602 may be implemented using any appropriate combination of hardware and/or software configured for wired and/or wireless communication over network 610. For example, in one embodiment, the user device 602 may be implemented as a personal computer of a user in communication with the Internet. In some embodiments, the user device 602 may be a wearable device. In some embodiments, the user device 602 may be a smartphone, personal digital assistant (PDA), laptop computer, and/or other types of computing devices.

The user device 602 may include one or more browser applications which may be used, for example, to provide a convenient interface to permit the customer to browse information available over the network 610. For example, in one embodiment, the browser application may be implemented as a web browser configured to view information available over the Internet.

The user device 602 may also include one or more toolbar applications which may be used, for example, to provide user-side processing for performing desired tasks in response to operations selected by the customer. In one embodiment, the toolbar application may display a user interface in connection with the browser application.

The user device 602 may further include other applications as may be desired in particular embodiments to provide desired features to the user device 602. In particular, the other applications may include an online payment transaction application provided by an online payment transaction provider. The other applications may also include security applications for implementing user-side security features, programmatic user applications for interfacing with appropriate application programming interfaces (APIs) over the network 610, or other types of applications. Email and/or text applications may also be included, which allow the customer to send and receive emails and/or text messages through the network 610. The user device 602 includes one or more user and/or device identifiers which may be implemented, for example, as operating system registry entries, cookies associated with the browser application, identifiers associated with hardware of the user device 602, or other appropriate identifiers, such as a phone number. In one embodiment, the user identifier may be used by the system provider device 606, and/or the third party service provider device 604 associate the user with a particular account as further described herein.

Figure 7:
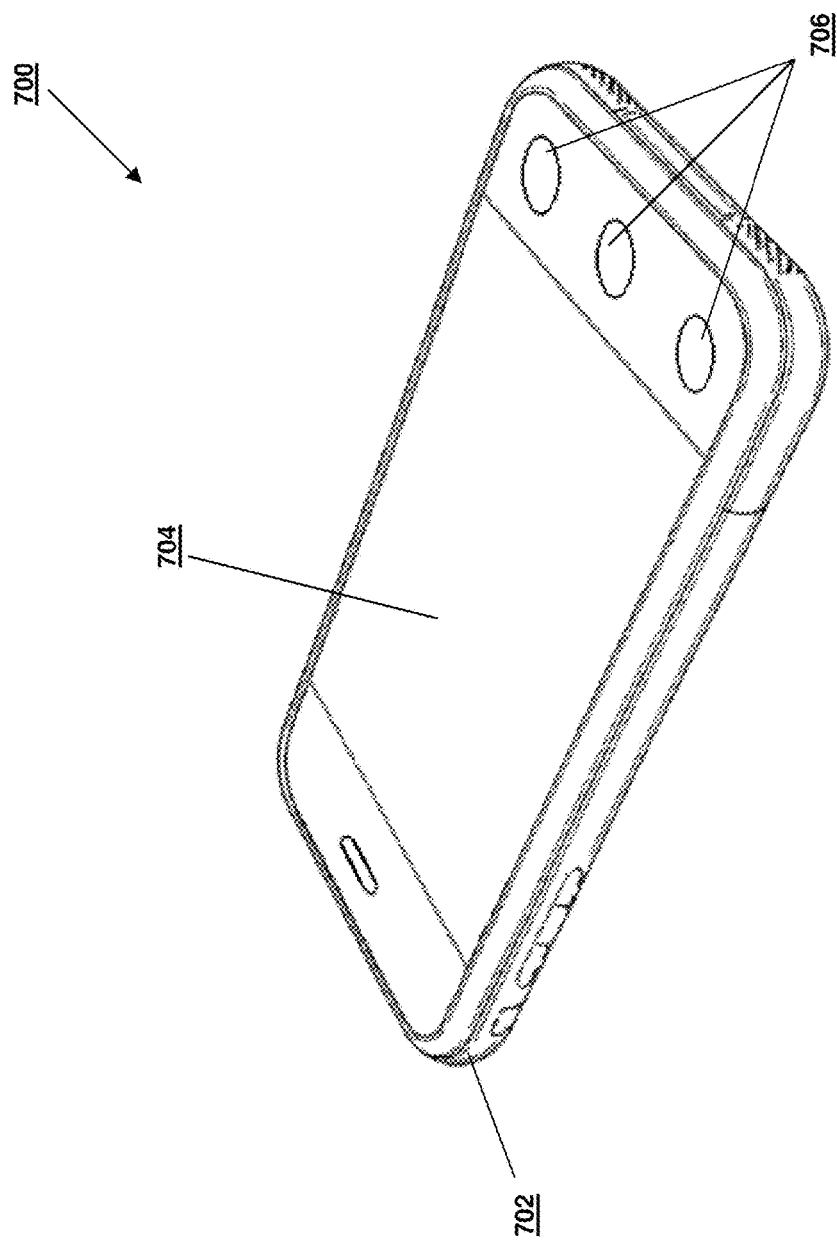
FIG. 7 is a perspective view illustrating an embodiment of a user device.

Referring now to FIG. 7, an embodiment of a user device 700 is illustrated. The user device 700 may be the user devices 602. The user device 700 includes a chassis 702 having a display 704 and an input device including the display 704 and a plurality of input buttons 706. One of skill in the art will recognize that the user device 700 is a portable or mobile phone including a touch screen input device and a plurality of input buttons that allow the functionality discussed above with reference to the method 100. However, a variety of other portable/mobile customer devices may be used in the method 100 without departing from the scope of the present disclosure.

Figure 8:
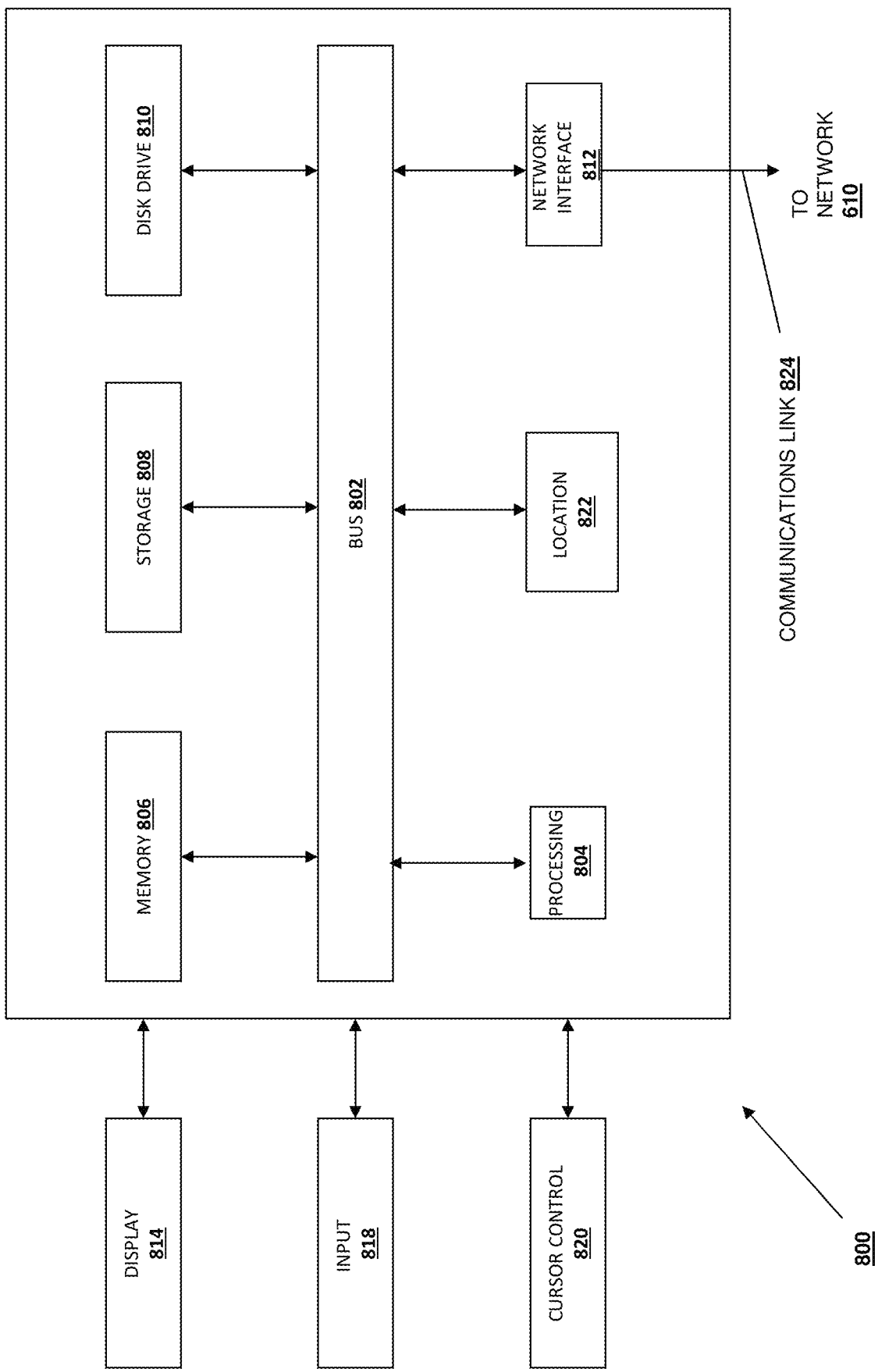
FIG. 8 is a schematic view illustrating an embodiment of a computer system.

Referring now to FIG. 8, an embodiment of a computer system 800 suitable for implementing, for example, user device 602, system provider device 606, and/or third-party service provider device 604 is illustrated. It should be appreciated that other devices utilized by users, system providers, third-party user information providers, third party service providers, and/or system providers in the system discussed above may be implemented as the computer system 800 in a manner as follows.

In accordance with various embodiments of the present disclosure, computer system 800, such as a computer and/or a network server, includes a bus 802 or other communication mechanism for communicating information, which interconnects subsystems and components, such as a processing component 804 (e.g., processor, micro-controller, digital signal processor (DSP), etc.), a system memory component 806 (e.g., RAM), a static storage component 808 (e.g., ROM), a disk drive component 810 (e.g., magnetic or optical), a network interface component 812 (e.g., modem or Ethernet card), a display component 814 (e.g., CRT or LCD), an input component 1218 (e.g., keyboard, keypad, or virtual keyboard), a cursor control component 820 (e.g., mouse, pointer, or trackball), and a location sensor component 822 (e.g., a Global Positioning System (GPS) device as illustrated, a cell tower triangulation device, and/or a variety of other location determination devices known in the art). In one implementation, the disk drive component 810 may comprise a database having one or more disk drive components.

In accordance with embodiments of the present disclosure, the computer system 800 performs specific operations by the processor 804 executing one or more sequences of instructions contained in the memory component 806, such as described herein with respect to the user devices 602, service provider device 606, and/or third-party service provider device 604. Such instructions may be read into the system memory component 806 from another computer-readable medium, such as the static storage component 808 or the disk drive component 810. In other embodiments, hard-wired circuitry may be used in place of or in combination with software instructions to implement the present disclosure.

Logic may be encoded in a computer readable medium, which may refer to any medium that participates in providing instructions to the processor 804 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 810, volatile media includes dynamic memory, such as the system memory component 806, and transmission media includes coaxial cables, copper wire, and fiber optics, including wires that comprise the bus 802. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 800. In various other embodiments of the present disclosure, a plurality of the computer systems 800 coupled by a communication link 824 to the network 610 (e.g., such as a LAN, WLAN, PTSN, and/or various other wired or wireless networks, including telecommunications, mobile, and cellular phone networks) may perform instruction sequences to practice the present disclosure in coordination with one another.

The computer system 800 may transmit and receive messages, data, information and instructions, including one or more programs (i.e., application code) through the communication link 824 and the network interface component 812. The network interface component 812 may include an antenna, either separate or integrated, to enable transmission and reception via the communication link 824. Received program code may be executed by processor 804 as received and/or stored in disk drive component 810 or some other non-volatile storage component for execution.

Figure 9:
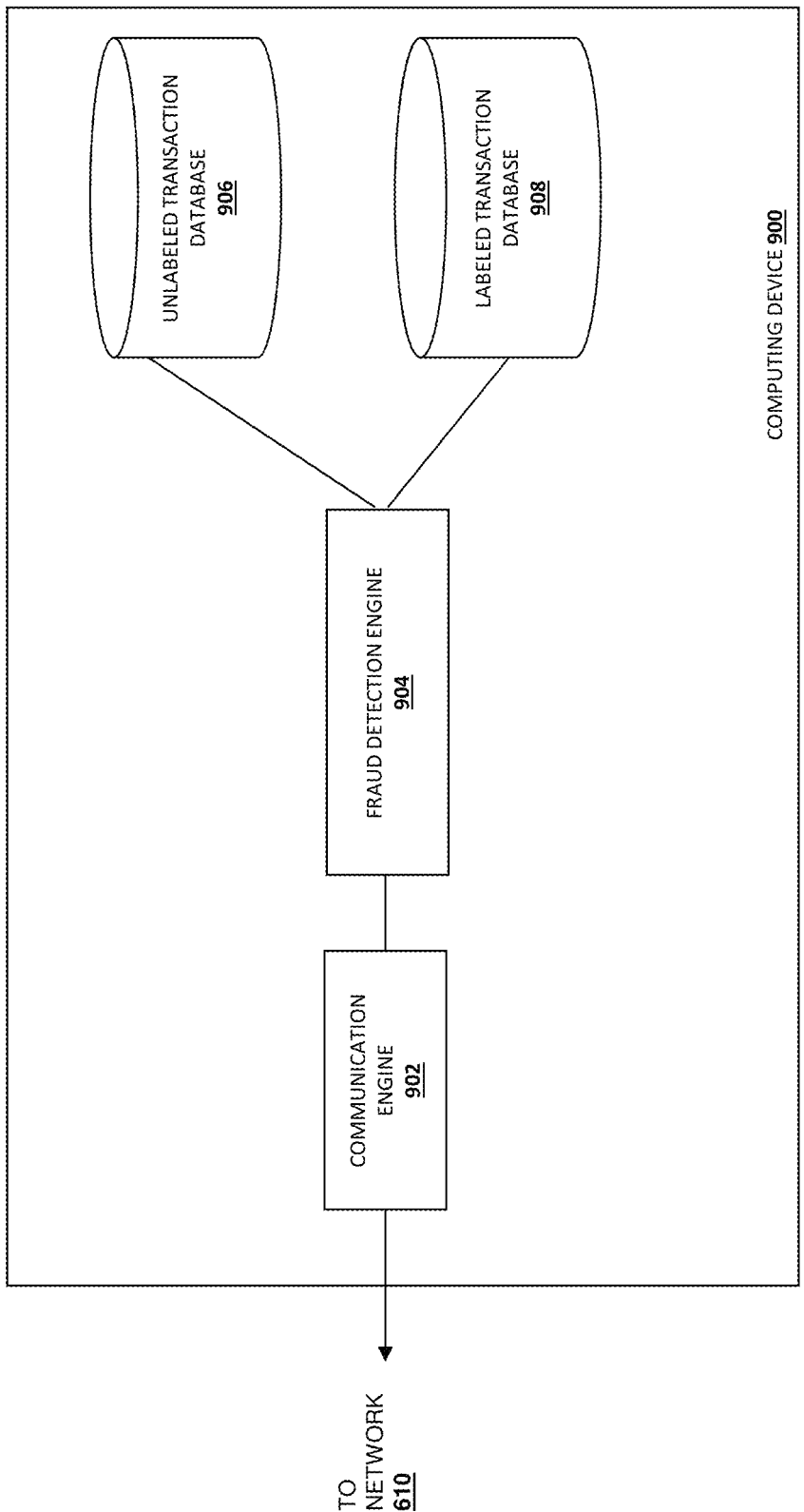
FIG. 9 is a schematic view illustrating an embodiment of a device that may be used as a user device and/or a system provider device.

Referring now to FIG. 9, an embodiment of a device 900 is illustrated. In an embodiment, the device 900 may be a system provider device 606 discussed above. The device 900 includes a communication engine 902 that is coupled to the network 610 and to a fraud detection engine 904 that is coupled to an unlabeled transaction database 906 and a labeled transaction database 908. The first training dataset may be generated using the unlabeled transaction database 906 (e.g., including unlabeled transactions) and labeled transaction database 908 (e.g., including labeled transactions). The communication engine 902 may be software or instructions stored on a computer-readable medium that allows the device 900 to send and receive information over the network 610. The fraud detection engine 904 may be software or instructions stored on a computer-readable medium that is operable to perform operations including performing a first training process, using a first training dataset including a plurality of transactions, on a neural network system including an autoencoder including an encoder and a decoder to generate a trained autoencoder, wherein a trained encoder of the trained autoencoder is configured to receive a first plurality of input data in an N-dimensional data space and generate a first plurality of latent variables in an M-dimensional latent space, wherein M is an integer less than N. The operations further include performing a sampling process to the first plurality of latent variables to generate a first plurality of latent variable samples; generating, using a trained decoder of the trained autoencoder, a second training dataset in the N-dimensional data space using the first plurality of latent variable samples; and performing a second training process, using the second training dataset, on a first classifier including a first classifier neural network model to generate a trained classifier for providing transaction classification of a first transaction. The operations may also provide any of the other functionality that is discussed above. While the databases 906-908 have been illustrated as separate from each other and located in the device 900, one of skill in the art will recognize that any or all of the databases 906-908 may be combined and/or may be connected to the fraud detection engine 904 through the network 610 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system for training a neural network classifier, comprising:
   a non-transitory memory; and
   one or more hardware processors coupled to the non-transitory memory and configured to read instructions from the non-transitory memory to cause the system to perform operations comprising:
   obtaining a first plurality of latent variable samples corresponding to a plurality of transactions, the first plurality of latent variable samples generated using an encoder of a trained autoencoder based on a first training dataset;
   generating, using the neural network classifier, a plurality of classification probabilities for the first plurality of latent variable samples, each classification probability in the plurality of classification probabilities indicating a probability that a corresponding transaction is associated with one of a plurality of classifications;
   modifying the first plurality of latent variable samples based at least in part on the plurality of classification probabilities, wherein the modifying the first plurality of latent variable samples comprises removing at least one latent variable sample from the first plurality of latent variable samples and adding one or more latent variable samples to the first plurality of latent variable samples;
   generating, using a decoder of the trained autoencoder, a second training dataset based on the modified first plurality of latent variable samples; and
   training the neural network classifier using the second training dataset.

2. The system of claim 1, wherein the neural network classifier is a first neural network classifier, and wherein the operations further comprise training a second neural network classifier using the second training data set.

3. The system of claim 1, wherein the generating the second training dataset is performed using an adaptive bootstrap sampling process.

4. The system of claim 1, further comprising a fraudulent transaction generative adversarial network (GAN) including a fraudulent transaction generator and a fraud discriminator, wherein the fraud transaction generator includes the decoder, and wherein the operations further comprise:
   training the fraudulent transaction GAN using a fraud-sensitive weighted adversarial loss function based on the plurality of classification probabilities.

5. The system of claim 1, wherein the neural network classifier is trained using a cross-entropy loss function.

6. The system of claim 2, wherein the second neural network classifier is different from the first neural network classifier.

7. The system of claim 1, wherein the system further comprises a prior distribution generative adversarial network (GAN) including a generator and a prior distribution discriminator, wherein the generator comprises the encoder, and wherein the operations further comprise:
   training the prior distribution GAN using a predetermined prior distribution.

8. A method, comprising:
   obtaining, by a computer system, a first plurality of latent variable samples corresponding to a plurality of transactions, the first plurality of latent variable samples generated using an encoder of a trained autoencoder based on a first training dataset;

generating, by the computer system and using a first classifier, a plurality of classification probabilities for the first plurality of latent variable samples, each classification probability in the plurality of classification probabilities indicating a probability that a corresponding transaction is associated with one of a plurality of classifications;

modifying, by the computer system, the first plurality of latent variable samples based at least in part on the plurality of classification probabilities, wherein the modifying the first plurality of latent variable samples comprises removing at least one latent variable sample from the first plurality of latent variable samples and adding one or more latent variable samples to the first plurality of latent variable samples;

generating, by the computer system and using a decoder of the trained autoencoder, a second training dataset based on the modified first plurality of latent variable samples; and training, by the computer system, a second classifier using the second training dataset.

9. The method of claim 8, wherein the second classifier is a same classifier as the first classifier.

10. The method of claim 8, wherein the generating the second training dataset is performed using an adaptive bootstrap sampling process.

11. The method of claim 8,
further comprising training a fraudulent transaction generative adversarial network (GAN) using a fraud-sensitive weighted adversarial loss function based on the plurality of classification probabilities, wherein the fraudulent transaction GAN includes a fraudulent transaction generator and a fraud discriminator, and wherein the fraud transaction generator includes the decoder of the trained autoencoder.

12. The method of claim 8, wherein the second classifier is trained using a cross-entropy loss function.

13. The method of claim 8, wherein the second classifier is different from the first classifier.

14. The method of claim 8,
further comprising training a prior distribution generative adversarial network (GAN) using a predetermined prior distribution, wherein the prior distribution GAN includes a generator and a prior distribution discriminator, and wherein the generator includes the encoder of the trained autoencoder.

15. A non-transitory machine-readable medium having stored thereon machine-readable instructions executable to cause a machine to perform operations comprising:
obtaining a first plurality of latent variable samples corresponding to a plurality of transactions, the first plurality of latent variable samples generated using an encoder of a trained autoencoder based on a first training dataset;

generating, using a first classifier, a plurality of classification probabilities for the first plurality of latent variable samples, each classification probability in the plurality of classification probabilities indicating a probability that a corresponding transaction is associated with one of a plurality of classifications;

modifying the first plurality of latent variable samples based at least in part on the plurality of classification probabilities, wherein the modifying the first plurality of latent variable samples comprises removing at least one latent variable sample from the first plurality of latent variable samples and adding one or more latent variable samples to the first plurality of latent variable samples;

generating, using a decoder of the trained autoencoder, a second training dataset based on the modified first plurality of latent variable samples; and training a second classifier using the second training dataset.

16. The non-transitory machine-readable medium of claim 15, wherein the second classifier is a same classifier as the first classifier.

17. The non-transitory machine-readable medium of claim 15, wherein the generating the second training data set is based on an adaptive bootstrap sampling process.

18. The non-transitory machine-readable medium of claim 15,
operations further comprise training a fraudulent transaction generative adversarial network (GAN) using a fraud-sensitive weighted adversarial loss function based on the plurality of classification probabilities, wherein the fraudulent transaction GAN includes a fraudulent transaction generator and a fraud discriminator, and wherein the fraud transaction generator includes the decoder.

19. The non-transitory machine-readable medium of claim 15, wherein the second classifier is trained using a cross-entropy loss function.

20. The non-transitory machine-readable medium of claim 15, wherein the second classifier is different from the first classifier.

* * * * *

UNITED STATES PATENT AND TRADEMARK OFFICE
CERTIFICATE OF CORRECTION

PATENT NO. : 11,610,098 B2
APPLICATION NO. : 16/234188
DATED : March 21, 2023
INVENTOR(S) : Dong It is certified that error appears in the above-identified patent and that said Letters Patent is hereby corrected as shown below:

In the Claims

Claim 18, Column 14, Lines 34-35, change "claim 15, operations further comprise training" to --claim 15, wherein the operations further comprise training.--.

Signed and Sealed this
Second Day of May, 2023

*Katherine Kelly Vidal*

Katherine Kelly Vidal
*Director of the United States Patent and Trademark Office*